3,342,659
METHOD OF MAKING ASSEMBLED FASTENER STRIPS

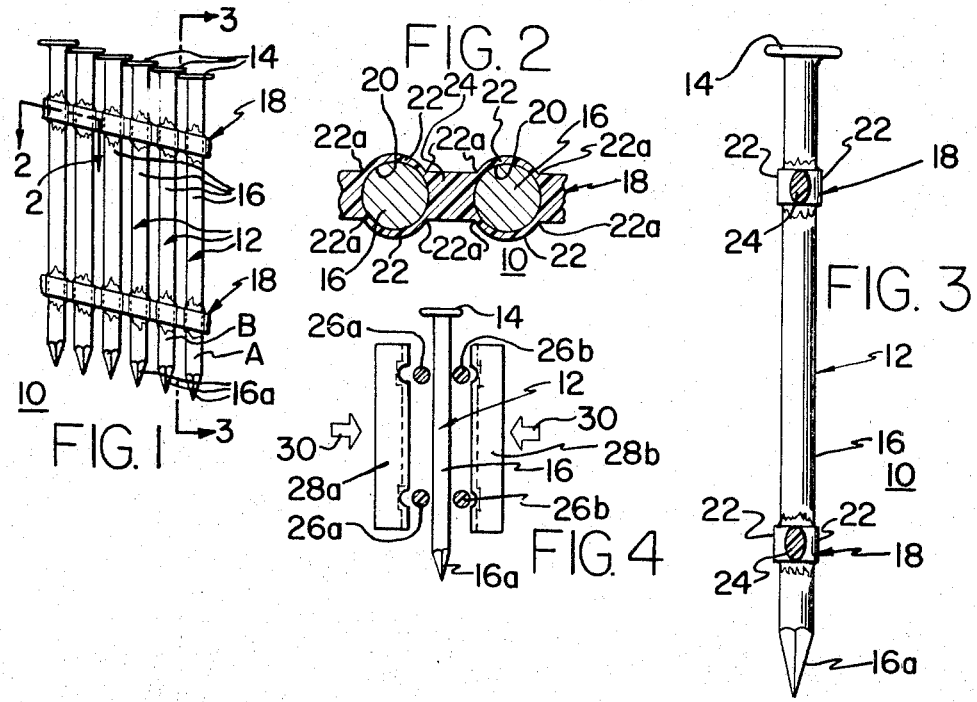

William H. Baum, Westchester, and John Mosetich, Elmhurst, Ill., assignors to Fastener Corporation, Franklin Park, Ill., a corporation of Illinois
Original application Oct. 3, 1963, Ser. No. 313,511, now Patent No. 3,212,632, dated Oct. 19, 1965. Divided and this application Mar. 26, 1965, Ser. No. 442,977
15 Claims. (Cl. 156—296)

This is a divisional application of United States application Ser. No. 313,511, filed Oct. 3, 1963, now United States Patent No. 3,212,632.

The present invention relates generally to fasteners, such as nails and the like, and more specifically to a new and improved method of arranging and securing the fasteners in an assemblage for use in automatic fastener apparatus.

With the advent of electrically and pneumatically operated fastener driving tools capable of driving larger fasteners, such as common nails, it is highly desirable and therefore an object of the present invention to provide a new and improved method of making an assemblage of fasteners wherein each fastener is securely held in position in a carrier strip formed of flexible strip means but can be readily separated from the strip as it is driven by the driving blows of a fastener driving tool.

Yet another object of the present invention is the provision of a new and improved method of forming a flexible carrier strip or assemblage of fasteners for use in fastener driving tools.

Still another object of the present invention is the provision of a new and improved method of forming flexible strips of fasteners for use in driving apparatus wherein strips of flexible plastic material are extended across the shanks of fasteners on opposite sides thereof and formed into a single integral flexible carrier strip holding the fasteners in place.

Yet another object of the present invention is the provision of a new and improved method of forming a strip or assemblage of fasteners in which the fasteners are coated with a material for increasing the holding power of the fasteners in the material into which they are driven and are secured in a carrier strip formed of flexible material compatible with and bonded to said coating material.

The foregoing and other objects and advantages of the present invention are accomplished by the provision of a new and improved method of making an assemblage of fasteners for use in fastener driving apparatus wherein the individual fasteners are positioned with their shanks in side-by-side relation, and carrier strips of flexible plastic material are applied to extend transversely of the shanks on opposite sides thereof. The opposed strips are placed in contact with each other between the shanks of adjacent fasteners, and the contacting portions are united forming an integral body holding the fasteners in side-by-side relation.

The fasteners may be coated with a surface material which is compatible with the material of the carrier strips forming an integral bond therewith.

For a better understanding of the present invention reference should be had to the following detailed description taken in conjunction with the drawings, in which:

FIG. 1 is a fragmentary side elevational view of a new and improved strip of fasteners constructed in accordance with the method of the present invention;

FIG. 2 is a sectional view taken substantially along the line 2—2 of FIG. 1;

FIG. 3 is an enlarged sectional view taken substantially along the line 3—3 of FIG. 1;

FIG. 4 schematically illustrates the new and improved method of assembling the strip of fasteners shown in FIG. 1.

Referring now more particularly to the drawings, there in is illustrated a new and improved strip or assemblage of fasteners which is constructed in accordance with the present invention and which is indicated generally by the reference numeral 10. The assemblage 10 includes a plurality of individual fasteners such as common nails 12 having heads 14 and depending shanks 16 with pointed lower ends 16a. The nails 12 are arranged with their shanks 16 in parallel side-by-side relation and are spaced apart a distance determined by the size of the heads 14. Each head 14 is arranged so that one edge thereof touches the shank 16 of the adjacent nail 12 and so that the top surface thereof underlies a portion of the lower surface of the head of this adjacent nail. The nails 12 are arranged as described so that as the first nail A of the strip 10 (FIG. 1) is driven downwardly by a drive member of a fastener driving apparatus, the head 14 thereof will move downwardly and the left-hand edge thereof will touch or scrape along the right-hand edge of the second nail B in the strip. This action is desirable in order that the head 14 of each nail 12, as it is driven, will shear off the means holding the nail to the strip 10 of the nails.

In order to secure the nails 12 in the position shown in FIG. 1 to form the strip 10, there is provided a pair of parallel and vertically spaced flexible plastic carrier strips 18 which extend generally transversely across the shanks 16 of the nails below the heads 14 thereof. These carrier strips 18 are preferably formed of a thermoplastic resin, such as a vinyl resin (e.g. polyvinyl chloride) which is strong, light, and flexible and can be readily molded by heat and pressure into the desired shape.

Preferably, the nails 12 are covered with a coating material for increasing the holding power of the nails in the material into which they are driven. The coating material should be compatible with the material of the strips 18 in order to form a bond therewith as the strips are secured to the nails. Several coating materials have been used successfully with strips 18 made of polyvinyl chloride. One such coating material consists of 25% polyvinyl chloride resin, toluene 37½%, and 37½% acetone. Another coating material consists of the combination of 24% polyvinyl chloride, 38% high boiling chlorinated hydrocarbon, and 38% high boiling ketone solvent. The former coating material has a flash point of approximately 30° F. and the latter a higher flash point of approximately 130° F. The coating material may be applied to the fasteners 12 by appropriate means such as tumbling in a hopper, wiping, spraying, or rolling, and it has been found that either of the coating materials described bonds well with strips 18 composed of extruded polyvinyl chloride material with a combination of phthalate plasticizer and a barium cadmium laurate stabilizer system. The strips 18, formed of this material, can be suitably molded at temperatures in the range of 280° to 310° F., and when the material solidifies and is at room temperature it has a durometer hardness (A-scale) of 80. It is to be understood that various other types of flexible plastic materials can be used for forming the carrier strips 18.

Each of the strips 18 is formed with a plurality of spaced shank receiving apertures 20 (FIG. 2) having sidewalls 22 forming the circular apertures to receive the shanks 16 of the nails. The strip 18 also includes portions 24 which are interconnected to the circular sidewalls 22 to form an integral continuous strip. The sidewalls 22 are formed with segments 22a adjacent the region of interconnection of the sidewalls 22 and the interconnecting portions 24 of the strips 18. These segments 22a are of reduced cross-sectional area to facilitate the shearing or fracturing of the strip 18 at these regions by the head 14 of the nail 12 as it is driven.

In forming the strip 10 of fasteners, the individual nails 12 are positioned with their shanks 16 arranged in parallel side-by-side relation with their heads 14 arranged as illustrated in FIG. 1. The nails may be precoated as before described in a tumbling hopper or can be coated after they are aligned by means of rollers, wiping pads, or sprays. Two pairs of strips 26a and 26b of flexible plastic material, such as polyvinyl chloride, are positioned to extend across the shanks 16 of the positioned nails on opposite sides thereof as indicated in FIG. 4. Two dies 28a and 28b having cavities defined therein to accommodate the nail shanks 16 and cavities which are shaped to form the strips 26a and 26b together into the single integral carrier strip 18 of the configuration described, are moved together in the direction of the arrows 30. Sufficient heat and pressure are applied to the dies 28a and 28b to mold the pairs of opposed strips 26a and 26b into a single integral carrier strip 18 of the configuration described, with the nails 12 firmly secured therein. The heat and pressure form a tight bond between the coating on the nails and the formed carrier strip 18 so that the nails will not slip in the apertures 20 therein. The strips 26a and 26b may be heated by appropriate means, such as heat lamps, to temperatures in the range of 280°–310° F. as they are extended along the shanks of the nails in order to obtain a good bond with the coated nails and between the two strips forming the integral carrier strip 18. The opposed cavities in the dies 28a and 28b force the opposed pairs of strips 26a and 26b together so that the nail shank receiving apertures 20 are formed with the sidewalls 22 having reduced cross-sectional segments 22a and the interconnecting portions 24 are integrally formed therewith. When the molding process has been completed, the dies 28a and 28b are then opened to allow the completed nail strip 10 to be removed.

The completed strip 10 is then ready for use in the magazine of a nail driving apparatus. As each nail 12 of the strip 10 is driven, the head thereof shears the flexible strips 18 at the segments 22a which are small in cross section, and the fragmentary portions of these strips fall away. It has been found that because of the bond obtained between the coating on the nails and the carrier strip 18 that when the strip is severed during driving of the nails 12, particles of the strip which are broken away are relatively large and not subject to chipping and flying off the gun as is the case with other types of material. Moreover, should portions of the strip 18 remain on the nail shank 16 as the nail is driven, because of the bond, the holding power of the nail in the material into which it is driven is further increased. It has been found that strips 18 formed of polyvinyl chloride work well since they are extremely flexible, yet strong, and do not "gum up" the driving apparatus since the reduced cross-sectional segments 22a provide for even sharing, and ragged tearing of the strips is common.

While it is generally preferable to have coated fasteners because of their increased holding ability, it is within the scope of the present invention to provide strips of fasteners as described wherein the fasteners are not coated or are only partially coated in the regions where the various strip means are assembled. It is also to be understood that while the embodiment illustrated in the drawing shows the head of each fastener overlying a portion of the head of an adjacent fastener, it is within the scope of the present invention to arrange the fasteners with their shanks in spaced apart parallel relation with the heads lying along a common plane and the edges thereof touching one another or closely adjacent. The specific arrangement of the fasteners of a strip will depend upon the type of magazine assembly of the fastener driving apparatus.

While the present invention has been described in connection with details of an illustrative embodiment, these details are not intended to be limitative of the invention except as set forth in the accompanying claims.

What is claimed as new and desired to be secured by United States Letters Patent is:

1. A method of making an assemblage of fasteners of the type having elongated shanks comprising the steps of positioning said fasteners with the shanks thereof in spaced side-by-side relation; applying strips of thermoplastic material transversely across the shanks on opposite sides thereof; placing the opposed strips in contact with each other in spaces between the shanks of adjacent fasteners; and uniting the contacting portions of opposed strips to form a single integral body holding the fasteners spaced in side-by-side relation.

2. A method as claimed in claim 1 including the steps of heating the two strips of thermoplastic material to permit them to be displaced into contact in the spaces between the shanks of the fasteners.

3. A method as claimed in claim 1 including the step of applying pressure to the opposed strips of material to force them into contact with each other and the shanks of the fasteners.

4. A method as claimed in claim 1 including the step of applying a surface coating to the shanks of the fasteners, which coating increases the holding power of the fasteners and is compatible for bonding with the thermoplastic material.

5. A method of making an assemblage of fasteners of the type having elongated shanks characterized by the steps of positioning said fasteners with the shanks thereof in spaced side-by-side relation; applying strips of thermoplastic material transversely across the shanks on opposite sides thereof; placing the opposed strips in contact with each other between the shanks of the fasteners; and heating the contacting portions of the opposed strips and bonding them together to form a single integral body holding the fasteners in said spaced side-by-side relation.

6. A method as claimed in claim 5 including the step of applying pressure to the elongated masses of material to force the masses into contact with each other and the shanks of the fasteners.

7. A method as claimed in claim 5 including the step of applying a surface coating including a thermoplastic resin on the shanks of the fasteners, which coating is compatible for bonding with the thermoplastic material of the strips on application of heat.

8. A method as claimed in claim 7 in which the surface coating is a vinyl polymer resin.

9. A method of making an assemblage of fasteners of the type having enlarged transverse heads and elongated depending shanks comprising the steps of positioning said fasteners with the shanks thereof in spaced side-by-side relation with portions of the head of one fastener underlying a portion of the head of an adjacent fastener on one side and overlying a portion of the head of an adjacent fastener on the other side; applying strips of flexible plastic material generally transversely across said shanks on opposite sides thereof; moving said opposed strips together to contact each other between said shanks; and uniting the contacting portions of opposed strips forming an integral body holding the fasteners in side-by-side relation.

10. A method as defined in claim 9 wherein the shanks of said fasteners are positioned in spaced parallel relation with one another.

11. A method of making an assemblage of fasteners of the type having elongated shanks comprising the steps of positioning said shanks of said fasteners in side-by-side spaced relation, extending strips of flexible plastic material generally transversely along opposite sides of said shanks, and forming said opposed strips into an integral strip means having spaced apart shank receiving apertures alternately spaced between interconnecting portions extending between adjacent shanks.

12. A method of preparing an assemblage of fasteners of the type having elongated shanks comprising the steps of positioning said shanks in side-by-side spaced relation, coating portions of said shanks with material for improving the holding power of said fasteners in the material into which they are driven, extending strips of flexible plastic material transversely along opposite sides of the shanks of said fasteners, forcing said opposed strips into contact with each other between said shanks, and bonding said strips to said coated portions of said fasteners forming an integral carrier strip for holding said fasteners in said assemblage.

13. A method of preparing an assemblage of fasteners of the type having elongated shanks comprising the steps of coating portions of the shanks of said fasteners with a thermoplastic material, extending heated strips of flexible thermoplastic material transversely across opposite sides of the shanks of said fasteners and bonding said opposed strips into an integral strip for holding said fasteners.

14. A method of preparing an assemblage of fasteners of the type having elongated shanks comprising the steps of coating portions of the shanks of said fasteners with a thermoplastic vinyl resin, extending strips of flexible thermoplastic resin transversely across opposite sides of said shanks and applying heat to said opposed strips to form an integral fastener carrier bonded to said coating resin.

15. A method of preparing an assemblage of fasteners of the type having elongated shanks comprising the steps of coating portions of said shanks with material for improving the holding power of said fasteners in the material into which they are driven, extending strips of flexible plastic material transversely along opposite sides of the shanks of said fasteners, and bonding said strips to said coated portions of said fasteners by heat to form an integral carrier strip for holding said fasteners in said assemblage.

References Cited

UNITED STATES PATENTS

| | | | |
|---|---|---|---|
| 1,730,929 | 10/1929 | Flynn | 161—115 X |
| 1,883,113 | 10/1932 | Titchener | 156—297 |
| 2,511,769 | 6/1950 | Chamberlain | 156—305 X |
| 2,676,704 | 4/1954 | Marks | 156—297 X |
| 2,679,281 | 5/1954 | Paulucci | 156—304 X |
| 2,767,113 | 11/1956 | Bower | 156—179 X |
| 3,165,868 | 1/1965 | MacDonald et al. | 53—244 X |
| 3,170,279 | 2/1965 | Dubini | 59—77 |
| 3,242,850 | 3/1966 | Adams et al. | 156—522 |
| 3,256,123 | 6/1966 | Hart | 53—35 X |
| 3,267,660 | 8/1966 | Matthews | 59—77 |

EARL M. BERGERT, *Primary Examiner.*

HAROLD ANSHER, *Examiner.*